United States Patent [19]

Cannon et al.

[11] 4,029,535
[45] June 14, 1977

[54] PROCESS FOR SEAMING FABRICS COMPRISING THERMOPLASTIC FIBERS USING LASER BEAMS

[75] Inventors: Cyril George Cannon; Alan Selwood, both of Harrogate, England

[73] Assignee: Imperial Chemical Industries Limited, London, England

[22] Filed: Sept. 1, 1976

[21] Appl. No.: 719,534

Related U.S. Application Data

[63] Continuation of Ser. No. 564,506, April 2, 1975, abandoned.

[30] Foreign Application Priority Data

Apr. 16, 1974 United Kingdom ............ 16446/74

[52] U.S. Cl. .............................. 156/272; 156/290; 156/322; 219/121 LM
[51] Int. Cl.² .................. B23K 31/00; B29C 27/02
[58] Field of Search ............ 156/272, 306, 82, 290, 156/322, 324, 380, 267; 331/94.5 K, DIG. 1; 219/121 L, 121 LM

[56] References Cited

UNITED STATES PATENTS

| 2,293,568 | 8/1942 | Snyder | 156/322 |
| 2,387,566 | 10/1945 | Cüsters | 156/322 |
| 3,560,291 | 2/1971 | Foglia et al. | 156/272 |
| 3,783,062 | 1/1974 | Martin | 156/82 |

FOREIGN PATENTS OR APPLICATIONS 993,705  6/1965  United Kingdom ........ 219/121 LM

OTHER PUBLICATIONS

Dreyfus, R. W., et al., "Electron Beam Pumped Solid-State Scan Laser", IBM Tech. Discl. Bulletin, vol. 15, No. 2., (July 1972), pp. 527-528.

Primary Examiner—Charles E. Van Horn
Assistant Examiner—M. G. Wityshyn
Attorney, Agent, or Firm—Roderick B. Macleod

[57] ABSTRACT

A process for the seaming of two sheets of thermoplastic polymers, especially fabrics comprising thermoplastic fibres, by passing them around and through a pair of nip rolls and directing a pulsed laser beam at their line of confluence.

3 Claims, 1 Drawing Figure

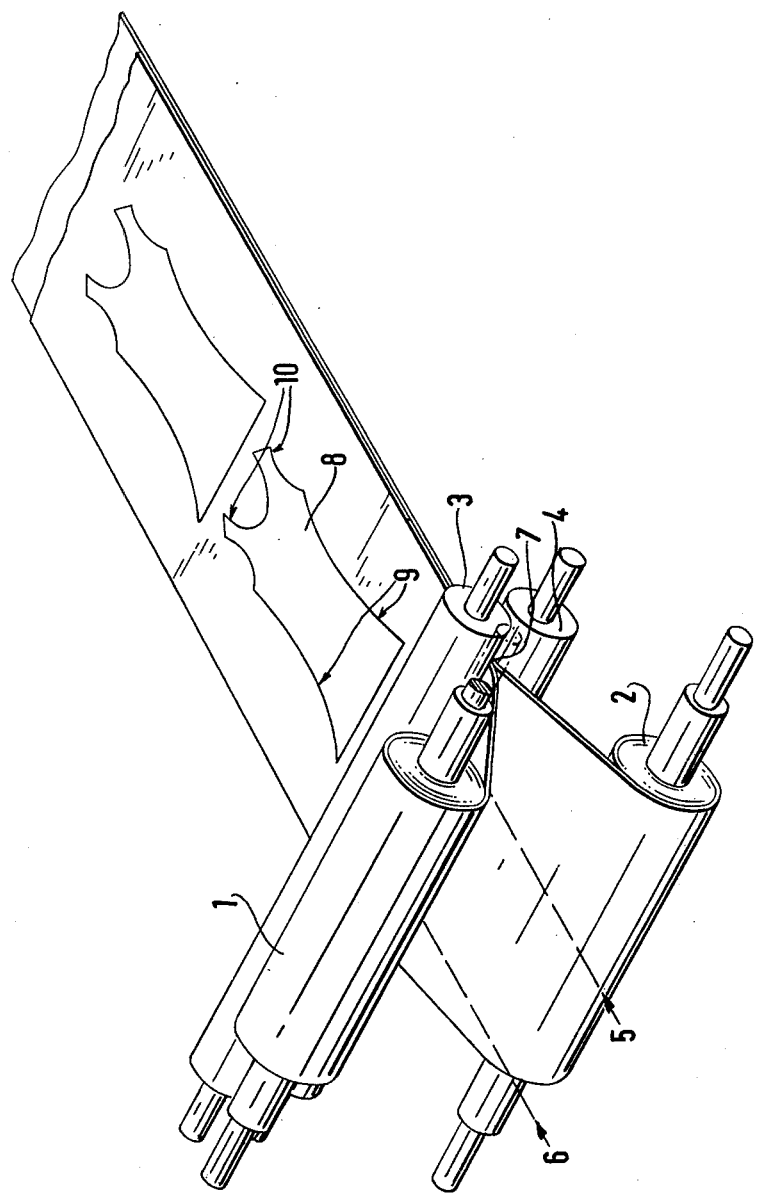

PROCESS FOR SEAMING FABRICS COMPRISING THERMOPLASTIC FIBERS USING LASER BEAMS

This is a continuation, of application Ser. No. 564,506, filed on Apr. 2, 1975 now abandoned.

The present invention relates to a method of and apparatus for seaming sheets comprising thermoplastic polymers.

By the term "sheets comprising thermoplastic polymers" is meant films produced from thermoplastic polymers, and fabrics, such as, for example, knitted, woven, or non-woven fabrics, comprising fibres formed from thermoplastic polymers. Preferably the fabrics comprise at least 5% by weight of thermoplastic fibres, desirably at least 20% by weight of such fibres, and even more desirably are comprised entirely of such fibres. The term "fibres" is meant to include both continuous filaments and staple fibres.

It is known to use a heat fusion process to seam sheets comprising thermoplastic polymers such as, for example, fabrics comprised of filaments or fibres spun from thermoplastic polymers. In such a process the fusion conditions must be very accurately controlled otherwise blobs of molten polymer are produced which may give rise to seams having a poor transverse strength. Furthermore, in a weld so produced in a fabric, the polymer is melted throughout the thickness of the fabrics and the surface texture is destroyed along the seam.

According to the present invention, a process for seaming together two sheets comprising thermoplastic polymers comprises bringing together part of one sheet with part of the other sheet and directing at their line of contact at least one focused beam of energy from a laser.

Preferably the sheets are pressed together along or in the vicinity of the line of contact to enable the surfaces of the sheets to make intimate contact. This ensures that those parts of the surfaces of the sheets softened by the effect of the laser beam are brought together whilst still in the softened condition to form a strong seam.

Desirably the laser beam is pulsed or chopped, the energy of the pulse being sufficient to melt at least part of the opposing surfaces of the sheets, but insufficient to penetrate completely through the sheet, thus preserving the surface texture of the fabric in the area of the seam.

During the seaming process the two sheets may be held stationary relative to each other and to the laser beam, or there may be a stepwise or continuous relative movement between the laser beam and the sheets. The two sheets may be brought together by any suitable method provided that the line of contact of the sheets is sufficiently exposed to allow the laser beam to reach the line of contact. Thus, for example, the sheets may be brought together by passing them between two plates, around two bars, or between two moving belts. Preferably the sheets are passed through a pair of adjustable nip rolls, at least one of the sheets being passed around part of its associated roll before entering the nip to adequately expose the line of contact of the sheets. The laser beam is then directed into the nip of the rolls.

According to a further aspect of the present invention there is provided a process for seaming together two sheets through a pair of nip rolls whereby at least one of the sheets passes around part of its associated roll before entering the nip, and directing at least one laser beam at the line of contact of the two sheets.

Depending upon the complexity of the shape of the seams required, one or more laser beams may be used, the beams being either static or capable of being traversed along the line of contact of the sheets. When a movable laser beam is used, the speed of the nip rolls and the position of the laser beam relative to the sheets may be controlled by a programmer, such as, for example, a punched tape, or a magnetic tape, to produce complexed shaped seams, for example, curved seams.

The laser beam, particularly when it is pulsed or chopped, may be oscillated over a narrow width to produce a seam comprising two or more rows of weld points.

Where it is required to cut the fabric after a seaming operation, the seamed fabric after leaving the nip of the rolls may pass into a cutting device. A laser cutting device is particularly suitable, in which case the laser beam or beams may be controlled by the same programmer which controls the seaming laser beam or beams and nip roll speed.

The process of the present invention is suitable for the seaming of woven, knitted, or non-woven fabrics during the manufacture of articles of apparel, such as, for example, dresses, smocks, jackets and trousers, the seaming replacing the conventional sewing stage. The process is particularly suitable for the mass production of garments controlled by a computer.

According to a further aspect of the present invention, there is provided an apparatus for seaming together two sheets comprising thermoplastic polymers, the apparatus having means for bringing together part of one sheet with part of the other sheet to form a line of contact, and a laser for directing a focused beam of energy towards a line corresponding to the line of contact of the sheets.

Seams produced by the process of the present invention may be very narrow, comprising a single weld or a single row of weld points, or it may comprise a number of adjacent rows of welds or weld points. Since only the opposing surfaces of the sheets are exposed to the laser beam, no blobs produced by the polymer melting are visible on the outer surfaces of the seamed sheets. Seams produced in fabric by the present process have particular advantages over seams produced by conventional welding/fusion methods. Thus, because the fabric on the outer surfaces of the fabric is not fused, it helps to destribute over a wide area any stresses which may be applied to a seam, thereby increasing the strength of the seam.

Where open ended seams, for example in a patch pocket, are produced by the process of the present invention, it is desirable to close-off the ends of the seams by, for example, spot welding or stitching.

The invention will now be further described by way of example with reference to the accompanying drawing which diagrammatically illustrates an apparatus for performing the process of the invention.

The apparatus shown is suitable for seaming together two fabrics comprising thermoplastic filaments or fibres in such a manner that the seamed fabrics may be subsequently cut to provide partially formed articles of apparel. It comprises fabric supply rolls 1 and 2 and rolls 3 and 4 which form a nip through which the fabric passes to be taken up by a means not shown. Pointing into the nip of the rolls are two pulsed laser beams 5 and 6. The nip rolls 3 and 4 are driven by an electric motor not shown and the laser beams 5 and 6 are traversed along the nip 7 by means not shown, the speed of the nip rolls and the position of the laser beam being controlled by a computer means not shown.

The fabric is passed through the nip rolls 3 and 4 at a controlled speed and the position of the laser beams 5 and 6 and their timing of activation is controlled so that the fabric is seamed as at 8 which, when subsequently cut, provides a partially formed dress, the seaming at 10 forming the shoulders and at 9 forming the sides of the dress.

Apparatus of the type shown in the drawings, except that it had a single fixed laser beam, was used to seam together various types of fabric. A "chopped" beam from a $CO_2$ laser of approximately 50 watts power was used and the fabric was fed through the nip rolls at a rate to produce 5 to 6 point bonds per inch. The seam strength, measured using an Instron Tensile Testing Machine (Registered Trade Mark), for the fabrics are given in the table.

| Type of Fabric | Seam strength (g.per inch) |
| --- | --- |
| 40 gauge Raschel knit 167 dtex f 30 CRIMPLENE and 15 tex × 2 worsted-spun 100% wool (5.1 oz per sq.yd.) | 1300 |
| Warp knit nylon (3.4 oz per sq.yd.) | 2173 |
| Warp knit 167 dtex f 30 CRIMPLENE (6.6 oz per sq.yd.) | 990 |
| Warp knit CRIMPLENE/nylon Jaspe'/CRIMPLENE (2.5 oz per sq.yd.) | 623 |
| Nylon (4 oz per sq.yd.) | 2272 |
| TERYLENE/CRIMPLENE woven fabric (4.2 oz per sq.yd.) | 2542 |
| 100% TERYLENE warp knit (4.4 oz per sq.yd.) | 1642 |
| CRIMPLENE/nylon Jaspe', CRIMPLENE, TERYLENE and nylon warp knit fabric (3.2 oz per sq.yd.) | 1200 |

(CRIMPLENE and TERYLENE are Registered Trade Marks)

What we claim is:

1. An improved process for seaming together two fabrics comprising fibers formed from thermoplastic polymers comprising heating the fabrics and combining the fabrics by passing them through a nip and exposing a line of contact between the fabrics to a heat source, wherein the improvement comprises directing at said line of contact a pulsed or chopped focused beam of energy from a laser traversable along said line of contact of said fabrics, said energy of said beam being sufficient to melt at least part of said contacting surfaces of said fabrics, but is insufficient to penetrate through said fabrics.

2. A process according to claim 1 wherein said laser beam is oscillated to form a seam comprising at least two rows of weld points.

3. A process according to claim 1 wherein a pair of nip rolls form said nip and at least one of said fabrics passes around its associated roll before entering said nip.

* * * * *